(12) United States Patent
Jin et al.

(10) Patent No.: US 11,830,635 B1
(45) Date of Patent: Nov. 28, 2023

(54) METHOD AND SYSTEM FOR DETERMINING BACKGROUND WATER TEMPERATURE OF THERMAL DISCHARGE FROM OPERATING NUCLEAR POWER PLANTS BASED ON REMOTE SENSING

(71) Applicant: FIRST INSTITUTE OF OCEANOGRAPHY, MINISTRY OF NATURAL RESOURCES, Qingdao (CN)

(72) Inventors: Yuxiu Jin, Qingdao (CN); Yongzhi Wang, Qingdao (CN); Jun Du, Qingdao (CN); Peng Ji, Qingdao (CN); Guoqiang Xu, Qingdao (CN); Xiaolong Zhao, Qingdao (CN); Jinling Luo, Qingdao (CN)

(73) Assignee: FIRST INSTITUTE OF OCEANOGRAPHY, MINISTRY OF NATURAL RESOURCES, Qingdao (CN)

( * ) Notice: Subject to any disclaimer, the term of this patent is extended or adjusted under 35 U.S.C. 154(b) by 0 days.

(21) Appl. No.: 18/314,494

(22) Filed: May 9, 2023

(30) Foreign Application Priority Data

Sep. 6, 2022 (CN) .......................... 202211081122.9

(51) Int. Cl.
*G01J 5/00* (2022.01)
*G21D 1/02* (2006.01)
(Continued)

(52) U.S. Cl.
CPC .............. *G21D 1/02* (2013.01); *G01K 1/024* (2013.01); *G01K 1/045* (2013.01); *G01K 1/143* (2013.01);
(Continued)

(58) Field of Classification Search
CPC ............ G21D 1/02; G21D 3/04; G01K 1/024; G01K 1/045; G01K 1/123; G01K 1/20; G01K 13/026; G21C 1/084; G21C 19/20
See application file for complete search history.

(56) References Cited

U.S. PATENT DOCUMENTS

2021/0389293 A1    12/2021   Zhang

FOREIGN PATENT DOCUMENTS

CN          101551275 B   *   7/2011
CN          203785812 U   *   8/2014
(Continued)

OTHER PUBLICATIONS

Nie, "Monitoring of Tianwan Nuclear Power Plant Thermal Pollution Based on Remotely Sensed Landsat Data" IGARSS 2020, 978-1-7281-6374.

(Continued)

*Primary Examiner* — Gail Kaplan Verbitsky
(74) *Attorney, Agent, or Firm* — Kaplan Breyer Schwarz, LLP; Stuart H. Mayer

(57) ABSTRACT

Disclosed are a method and a system for determining a background water temperature of thermal discharge from operating nuclear power plants based on the remote sensing. The system includes a station selection module, a model construction module, a background water temperature calculation module and a temperature rise calculation module; the general idea: constructing linear regression coefficients between water temperature reference station and water temperature estimation stations before the operation of the nuclear power plant based on historical satellite remote sensing water temperature data, and establishing a linear relationship model to calculate the background water temperature of the water temperature estimation of the operating nuclear power plant. The specific implementation route: the (Continued)

station selection module is connected with the model construction module, the model construction module is connected with the background water temperature calculation module, and the background water temperature calculation module is connected with the temperature rise calculation module.

9 Claims, 14 Drawing Sheets

(51) Int. Cl.
*G01K 1/024* (2021.01)
*G01K 1/04* (2006.01)
*G01K 1/20* (2006.01)
*G01K 1/143* (2021.01)
*G01K 3/06* (2006.01)
*G01K 3/04* (2006.01)

(52) U.S. Cl.
CPC ................................. *G01K 1/20* (2013.01);
*G01J 5/00* (2013.01); *G01K 3/04* (2013.01);
*G01K 3/06* (2013.01)

(56) References Cited

FOREIGN PATENT DOCUMENTS

| | | | | | |
|---|---|---|---|---|---|
| CN | 104361591 | A | * | 2/2015 | ............. G06Q 50/06 |
| CN | 104361591 | A | | 2/2015 | |
| CN | 104751252 | A | | 7/2015 | |
| CN | 105241429 | A | | 1/2016 | |
| CN | 108364264 | A | | 8/2018 | |
| CN | 109255158 | A | | 1/2019 | |
| CN | 111307297 | A | * | 6/2020 | |
| CN | 112735619 | A | * | 4/2021 | |
| CN | 113869683 | A | * | 12/2021 | |
| CN | 115144095 | B | * | 11/2022 | |
| CN | 218973634 | U | * | 5/2023 | |
| JP | S6082792 | A | * | 5/1985 | |
| JP | 10318844 | A | * | 12/1998 | |

OTHER PUBLICATIONS

Jie, "Study on the Distribution of Thermal Drainage in Tianwan Nuclear Power Station based on Landsat-8 data" Hydrographic Surveying and Charting vol. 40, No. 2, 2020.

Zhang, "Application of Thermal Infrared Remote Sensing in Monitoring Heated Water Discharge of Nuclear Power Plant" Uranium Geology, vol. 37 No. 3, May 2021.

* cited by examiner collecting distributions of satellite remote sensing sea surface water temperatures with a high spatiotemporal resolution before and after nuclear power plant operations and background information of nuclear power plants, based on the distributions of the satellite remote sensing sea surface water temperatures before and after the nuclear power plant operations and the background information, selecting a water temperature reference station and water temperature estimation stations ⎯ S1 collecting hourly satellite remote sensing sea surface water temperatures of the water temperature reference station and the water temperature estimation stations in typical seasons before the nuclear power plant operation, based on the satellite remote sensing sea surface water temperatures with the high spatiotemporal resolution, constructing a linear relationship model of water temperatures between the water temperature reference station and the water temperature estimation stations; and based on the linear relationship model, screening and eliminating the water temperature estimation stations not in line with predetermined conditions ⎯ S2 collecting a sea surface water temperature observation value of the water temperature reference station after the nuclear power plant operation and a satellite remote sensing synchronous sea surface water temperature value after the nuclear power plant operation, correcting a value of the satellite remote sensing sea surface water temperature to obtain a corrected parameter of the linear relationship model between the water temperature reference station and the water temperature estimation stations; and based on the corrected parameter, obtaining background water temperatures of the water temperature estimation stations after the nuclear power plant operation ⎯ S3 based on a water temperature of the water temperature reference station, calculating a difference value between the background water temperatures of the water temperature estimation stations and synchronous water temperatures of the water temperature estimation stations, and obtaining a temperature rise water temperature value ⎯ S4

FIG. 1

METHOD AND SYSTEM FOR DETERMINING BACKGROUND WATER TEMPERATURE OF THERMAL DISCHARGE FROM OPERATING NUCLEAR POWER PLANTS BASED ON REMOTE SENSING

CROSS-REFERENCE TO RELATED APPLICATIONS

This application claims priority to Chinese Patent Application No. 202211081122.9, filed on Sep. 6, 2022, the contents of which are hereby incorporated by reference.

TECHNICAL FIELD

The application belongs to a technical field of environmental monitoring, and in particular to a method and a system for determining a background water temperature of thermal discharge from operating nuclear power plants based on remote sensing.

BACKGROUND

Nuclear power plants consume nuclear energy to produce electricity on a large scale. China's eastern coastal areas are the center of China's electric loads, and the annual power consumption there accounts for more than 65% of the total. For the economical and convenient purposes, China's nuclear power plants are mainly built in coastal areas, seawater is used as cooling water, a once-through cooling water method is adopted to directly discharge the cooling water back to adjacent sea areas, and all discharged hot water enters adjacent sea areas, which may cause a sharp rise of the water temperature in local water areas, increase a chemical reaction rate, affect a reproduction rate of aquatic organisms and dissolved oxygen in water, cause decreases in the water density and the water viscosity, and accelerate the sedimentation of particulate matters, affect the sedimentation rate and the ability to carry sediments of suspended solids in water, and change the water quality of natural water. At the same time, the thermal discharge also affects zoobenthos, algae, fish species, corals and even beach creatures, changing their survival, growth and reproductive habits, etc. The thermal discharge from coastal nuclear power plants has a certain impact on the marine ecological environment. Strengthening the monitoring of the thermal impact of thermal discharge from coastal nuclear power plants is necessary to protect the coastal sea environment and maintain the normal operation of the ecosystem. On the other hand, regularly and accurately investigating and evaluating thermal discharge's influence range and intensity is an important reference for coastal heat discharge and the impact assessment of coastal nuclear power plants on the seawater environment.

However, there are still some problems in monitoring the thermal discharge from nuclear power plants:

first, there is a lack of basis to support reasonable parameters of the calculation model of the thermal discharge from newly-built coastal nuclear power plants;

second, the actual temperature rise of the thermal discharge from operating coastal nuclear power plants cannot be directly determined by observation;

third, the monitoring workload of conventional water temperature grid stations is large and the data range is limited;

fourth, there are disadvantages to monitor water temperatures by satellite remote sensing; and fifth, there are disadvantages of aircraft remote sensing, etc.

SUMMARY

The application provides a method for calculating the background water temperature of the sea environment near a drainage outlet after the operation of a coastal nuclear power plant according to the sea surface water temperatures measured by satellite remote sensing and the sea surface water temperatures measured at a single point before and after the operation of the coastal nuclear power plant, thereby obtaining the actual temperature rise and water temperature value.

To achieve the above purpose, the application provides the following scheme:

on one hand, a method for determining a background water temperature of thermal discharge from operating nuclear power plants based on remote sensing is provided in the application, and the method includes the following steps:

S1, collecting distributions of satellite remote sensing sea surface water temperatures with a high spatiotemporal resolution before and after nuclear power plant operations and background information of nuclear power plants, based on the distributions of the satellite remote sensing sea surface water temperatures before and after the nuclear power plant operations and the background information, selecting a water temperature reference station and water temperature estimation stations;

S2, collecting hourly satellite remote sensing sea surface water temperatures of the water temperature reference station and the water temperature estimation stations in typical seasons before the nuclear power plant operation, based on the satellite remote sensing sea surface water temperatures with the high spatiotemporal resolution, constructing a linear relationship model of water temperatures between the water temperature reference station and the water temperature estimation stations; and based on the linear relationship model, screening and eliminating the water temperature estimation stations not in line with predetermined conditions;

S3, collecting a sea surface water temperature observation value of the water temperature reference station after the nuclear power plant operation and a satellite remote sensing synchronous sea surface water temperature value after the nuclear power plant operation, correcting a value of the satellite remote sensing sea surface water temperature to obtain a corrected parameter of the linear relationship model between the water temperature reference station and the water temperature estimation stations; and based on the corrected parameter, obtaining background water temperatures of the water temperature estimation stations after the nuclear power plant operation; and S4, based on a water temperature of the water temperature reference station, calculating a difference value between the background water temperatures of the water temperature estimation stations and synchronous water temperatures of the water temperature estimation stations, and obtaining a temperature rise water temperature value.

Optionally, the background information in the Si includes a hydrological environment, a marine topography and meteorological information.

Optionally, a method for selecting the water temperature reference station in the S1 includes:

collecting the distributions of the satellite remote sensing sea surface water temperatures before and after the nuclear power plant operations, and selecting a station not affected by the thermal discharge as the water temperature reference station.

Optionally, a method for selecting the water temperature estimation stations in the S1 includes:

based on the distributions of the satellite remote sensing sea surface water temperatures before and after the nuclear power plant operations, selecting water temperature stations in a temperature-rising area of drainage outlets of the nuclear power plants; and carrying out an encryption interpolation on a distribution of the water temperature stations to obtain a plurality of the water temperature estimation stations.

Optionally, the linear relationship model includes:

a water temperature value of the water temperature estimation station=A×a water temperature value of the water temperature reference station+B;

where A and B are linear regression coefficients.

Optionally, a method for screening and eliminating the water temperature estimation stations not in line with the predetermined conditions in the S2 includes the following steps:

based on the linear relationship model, eliminating the water temperature estimation stations with a correlation below 0.85.

Optionally, a method for obtaining the background water temperature of the water temperature estimation stations in the S3 includes the following steps:

collecting the sea surface water temperature observation value of the water temperature reference station and the satellite remote sensing synchronous sea surface water temperature value, and based on the sea surface water temperature observation value, correcting the value of the satellite remote sensing sea surface water temperature to obtain the corrected parameter; and based on the corrected parameter and the linear relationship model, obtaining the background water temperatures of the water temperature estimation stations, and a value of the background water temperature of the water temperature estimation station=A×the water temperature value of the water temperature reference station+B+the corrected parameter.

On the other hand, a system for determining a background water temperature of thermal discharge from operating nuclear power plants based on remote sensing is also provided in the application, and the system includes a station selection module, a model construction module, a background water temperature calculation module and a temperature rise calculation module;

the station selection module is connected with the model construction module, and the station selection module is used for selecting the water temperature reference station and the water temperature estimation stations;

the model construction module is connected with the background water temperature calculation module, and the model construction module is used for constructing a linear relationship model between the water temperature values of the water temperature reference station and the water temperature estimation stations;

the background water temperature calculation module is connected with the temperature rise calculation module, and the background water temperature calculation module is used for calculating the background water temperatures of the water temperature estimation stations based on the linear relationship model; and the temperature rise calculation module is used for calculating the temperature rise water temperature values of the water temperature estimation stations.

Optionally, the station selection module includes an acquisition unit and a station selection unit;

the acquisition unit is connected with the station selection unit, and the acquisition unit is used for acquiring the distributions of the satellite remote sensing sea surface water temperatures and the background information of the nuclear power plants; and the station selection unit is used for selecting the water temperature reference station and the water temperature estimation stations based on the distributions of the satellite remote sensing sea surface water temperatures before and after the nuclear power plant operations and the background information.

The application has following beneficial effects:

first, the application establishes a linear relationship between a water temperature reference station and each water temperature estimation station according to the satellite remote sensing sea surface water temperature before the operation of the nuclear power plant, the environmental background water temperature of a plurality of water temperature estimation stations near the drainage outlet may be estimated in real-time through the water temperature reference station after the operation of the nuclear power plant, the environmental background water temperature is not affected by a disturbance of the thermal discharge, and the problem that the environmental background water temperature is difficult to obtain after the discharge of temperature rise cooling water;

second, the environmental background water temperature obtained in this application is different from the environmental background water temperature obtained by static statistics, so the environmental background water temperature of each water temperature estimation station may be calculated synchronously according to the real-time water temperature of the water temperature reference station, with high accuracy, and the obtained actual temperature rise water temperature value is accurate;

third, compared with the traditional multi-frequency water temperature grid station observation method, the investigation in this application requires less manpower and material resources. After establishing the water temperature linear relationship between the water temperature reference station and each water temperature estimation station, the environmental background water temperature of each water temperature estimation station may be calculated only by keeping the long-term observation of the water temperature reference station, thus saving a lot of manpower and material resources; and fourth, compared with water temperature retrieval methods by satellite remote sensing and aircraft remote sensing, the application is not restricted by meteorological factors; after establishing a linear relationship by remote sensing sea surface water temperature through Himawari satellite with high spatiotemporal resolution in the early stage, and by calculating the real-time sea surface water temperature observation value of the water temperature reference station, the application has a field measured water temperature precision and reliability higher than that obtained by satellite remote sensing. After correction and calculation, the synchronized environmental background water temperature of each water temperature estimation station may be obtained, and the synchronized environmental background water temperature may be subtracted from the absolute water temperature distribution near the drainage outlet obtained by satellite sensing and aircraft remote sensing, thus obtaining the actual temperature rise field distribution.

BRIEF DESCRIPTION OF THE DRAWINGS

To explain the technical scheme of this application more clearly, the drawings needed in the embodiments are briefly introduced below. The drawings in the following description are only some embodiments of this application. For ordinary technicians in this field, other drawings may be obtained according to these drawings without paying creative labor.

FIG. 1 is a schematic flow diagram of a method according to the application.

DETAILED DESCRIPTION

Figure 2:
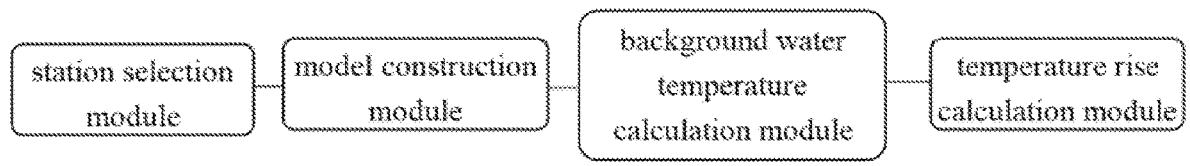
FIG. 2 is a schematic structural diagram of a system according to the application.

In the following, the technical scheme in the embodiment of the application will be clearly and completely described concerning the drawings in the embodiment of the application. The described embodiment is only a part of the embodiment of the application, but not the whole embodiment. Based on the embodiments in this application, all other embodiments obtained by ordinary technicians in this field without creative work belong to the protection scope of this application.

To make the above objects, features and advantages of this application more obvious and easier to understand, the application will be further described in detail with the attached drawings and specific embodiments.

Embodiment 1

As shown in FIG. 1, a method for determining a background water temperature of thermal discharge from operating nuclear power plants based on remote sensing is provided, and the method includes the following steps:

S1, collecting distributions of satellite remote sensing sea surface water temperatures with a high spatiotemporal resolution before and after nuclear power plant operations and background information of nuclear power plants, based on the distributions of the satellite remote sensing sea surface water temperatures before and after the nuclear power plant operations and the background information, selecting a water temperature reference station and water temperature estimation stations;

where the background information includes a hydrological environment, a marine topography and meteorological information. In this embodiment, Himawari satellite is used, its time resolution is 1 hour and its spatial resolution is 2 kilometers, which may meet the needs of continuous water temperature calculation. Compared with the general satellite that only provides a daily average temperature, the Himawari satellite remote sensing data has high time resolution, which may meet the needs of continuous calculation, and at the same time, the spatial resolution may meet the needs of selected stations in the sea area near the drainage outlet of the coastal nuclear power plant.

A method for selecting the water temperature reference station is as follows: collecting the satellite remote sensing sea surface water temperature distribution before and after the nuclear power plant operation, and selecting the station that is not affected by thermal discharge and is convenient for long-term observation of the sea surface water temperature in the later stage as the water temperature reference station. A method for selecting the water temperature estimation stations is as follows: according to the resolution of satellite remote sensing sea surface water temperature, arranging multiple water temperature sampling stations around the drainage outlet of the nuclear power plant, because the distribution of surface water temperatures near the site is similar before the operation of the nuclear power plant, at the same time, to ensure the calculation of background water temperature in the sea area around the drainage outlet, multiple water temperature estimation stations are arranged near the water outlet, and the spatial resolution of the water temperature estimation stations is higher than that of the water temperature sampling stations, and the water temperature of the water temperature sampling stations is interpolated to the water temperature estimation stations.

S2, collecting hourly satellite remote sensing sea surface water temperatures of the water temperature reference station and the water temperature estimation stations in typical seasons before the nuclear power plant operation, based on the satellite remote sensing sea surface water temperatures with the high spatiotemporal resolution, constructing a linear relationship model of water temperatures between the water temperature reference station and the water temperature estimation stations; and based on the linear relationship model, screening and eliminating the water temperature estimation stations not in line with predetermined conditions;

where the typical seasons include: summers and winters;

the seawater temperature equations are shown in the following formula (1), formula (2) and formula (3):

$$\frac{\partial u}{\partial x}+\frac{\partial v}{\partial y}+\frac{\partial w}{\partial z}=0; \quad (1)$$

$$\frac{\partial T}{\partial t}+u\frac{\partial T}{\partial x}+v\frac{\partial T}{\partial y}+w\frac{\partial T}{\partial z}=\frac{\partial}{\partial z}\left(K_h\frac{\partial T}{\partial z}\right)+F_T; \quad (2)$$

where u, v and w respectively represent current velocity components in x, y and z directions; T represents the seawater temperature; t represents time; $K_h$ represents a thermal vertical vortex viscosity coefficient; and FT represents a heat diffusion term or a heat source term.

At the sea surface z=ζ(x,y,t):

$$\frac{\partial T}{\partial z}=\frac{1}{\rho C_p K_h}[Q_n(x,y,z)-SW(x,y,\zeta,z)]; \quad (3)$$

where represents the fluctuation of sea level, $Q_n$(x,y,z) represents the net heat flux of the sea surface, including net downward long-wave radiation, net downward short-wave radiation, latent heat flux and sensible heat flux; SW(x,y,ζ,z) represents short-wave radiation from the sea surface; $C_p$ represents the specific heat of seawater; long-wave radiation, sensible heat flux and latent heat flux usually occur on the sea surface.

According to the seawater temperature equation (1), the seawater temperature equation (2) and the seawater temperature equation (3), it is known that the sea surface water temperature is closely related to heat fluxes and sea currents without the influence of the heat source term. In an open sea area or a semi-closed bay, the sea surface heat fluxes of two points C and D which are not far apart (generally within 20 kilometers) are the same. If the hydrological environments of the two points are basically the same (current distribution characteristics and the marine topography), the water temperature of points C and D will show a significant linear relationship without the influences of runoffs and other cold and heat sources.

The linear relationship model includes:

a water temperature value of the water temperature estimation station=A×a water temperature value of the water temperature reference station+B;

where A and B are linear regression coefficients.

A method for screening and eliminating the water temperature estimation stations includes the following steps:

based on the linear relationship model, eliminating the water temperature estimation stations with a correlation coefficient between the water temperature estimation station and the water temperature reference station below 0.85.

S3, collecting a sea surface water temperature observation value of the water temperature reference station after the nuclear power plant operation and a satellite remote sensing synchronous sea surface water temperature value after the nuclear power plant operation, correcting a value of the satellite remote sensing sea surface water temperature to obtain a corrected parameter of the linear relationship model between the water temperature reference station and the water temperature estimation stations; and based on the corrected parameter, obtaining background water temperatures of the water temperature estimation stations after the nuclear power plant operation;

a method for obtaining the background water temperatures of the water temperature estimation stations includes the following steps:

collecting the sea surface water temperature observation value of the water temperature reference station and the satellite remote sensing synchronous sea surface water temperature value, and based on the sea surface water temperature observation value, correcting the value of the satellite remote sensing sea surface water temperature to obtain the corrected parameter; and based on the corrected parameter and the linear relationship model, obtaining the background water temperatures of the water temperature estimation stations;

that is, a value of the background water temperature of the water temperature estimation station=A×the water temperature value of the water temperature reference station+B+the corrected parameter.

S4, based on a water temperature of the water temperature reference station, calculating a difference value between the background water temperatures of the water temperature estimation stations and synchronous water temperatures of the water temperature estimation stations, and obtaining a temperature rise water temperature value.

According to the seawater temperature method mentioned above, when one of points C or D is affected by a heat source, its linear relationship will be broken. Assuming that point C is affected by a heat source and point D is not affected by the heat source, when the temperature of point C is affected by an additional superimposed heat source, the water temperature of point C=the background water temperature of point C+temperature rise value or temperature drop value of point C; therefore, when the heat source affects point C and point D is not affected by the heat source, the temperature rise value or temperature drop value at point C cannot be directly distinguished by the on-site water temperature observation, but the environmental background water temperature at point C may be obtained through the water temperature at point D and the previous linear relationship between the water temperature at point C and the water temperature at point D, and the temperature rise value or temperature drop value at point C may be obtained through the on-site absolute water temperature observation (the environmental background water temperature+the temperature rise value or the temperature drop value) and the calculated environmental background water temperature at point C, thus obtaining the temperature rise value or the temperature drop value at point C influenced by the heat sources. Therefore, if the water temperature at points C and D is observed in advance before any point C or D is affected by the heat source, the linear relationship between the two is obtained, when one point of C or D is affected by a heat source or a cold source, the background water temperature of the affected point can be calculated through the linear relationship between the two, to obtain the water temperature rise value or water temperature drop value.

Embodiment 2

As shown in FIG. 2, a system for determining a background water temperature of thermal discharge from operating nuclear power plants based on remote sensing is also provided in the application, and the system includes a station selection module, a model construction module, a background water temperature calculation module and a temperature rise calculation module;

the station selection module is connected with the model construction module, and the station selection module includes an acquisition unit and a station selection unit; a working process of the station selection module includes following steps:

collecting the satellite remote sensing sea surface water temperature distribution before and after the nuclear power plant operation, and selecting the station that is not affected by thermal discharge, and is convenient for long-term observation of the sea surface water temperature in the later stage as the water temperature reference station. A method for selecting the water temperature estimation stations is as follows: according to the resolution of satellite remote sensing sea surface water temperature, arranging multiple water temperature sampling stations around the drainage outlet of the nuclear power plant, because the distribution of surface water temperatures near the site is similar before the operation of the nuclear power plant, at the same time, in order to ensure the calculation of background water temperature in the sea area around the drainage outlet, multiple water temperature estimation stations are arranged near the water outlet, and the spatial resolution of the water temperature estimation stations is higher than that of the water temperature sampling stations, and the water temperature of the water temperature sampling stations is interpolated to the water temperature estimation stations.

The model construction module is connected with the background water temperature calculation module, and a working process of the model construction module includes following steps:

the seawater temperature equations are shown in the following formula (1), formula (2) and formula (3):

$$\frac{\partial u}{\partial x} + \frac{\partial v}{\partial y} + \frac{\partial w}{\partial z} = 0; \tag{1}$$

$$\frac{\partial T}{\partial t} + u\frac{\partial T}{\partial x} + v\frac{\partial T}{\partial y} + w\frac{\partial T}{\partial z} = \frac{\partial}{\partial z}\left(K_h \frac{\partial T}{\partial z}\right) + F_T; \tag{2}$$

where u, v and w respectively represent current velocity components in x, y and z directions; T represents the seawater temperature; t represents time; $K_h$ represents a thermal vertical vortex viscosity coefficient; and $F_T$ represents a heat diffusion term or a heat source term.

At the sea surface $z=\zeta(x,y,t)$:

$$\frac{\partial T}{\partial z} = \frac{1}{\rho C_p K_h}[Q_n(x, y, z) - SW(x, y, \zeta, z)]; \tag{3}$$

where $\zeta$ represents the fluctuation of sea level, $Q_n(x,y,z)$ represents the net heat flux of the sea surface, including net downward long-wave radiation, net downward short-wave radiation, latent heat flux and sensible heat flux; $SW(x,y,\zeta,z)$ represents short-wave radiation from the sea surface; $C_p$ represents the specific heat of seawater; long-wave radiation, sensible heat flux and latent heat flux usually occur on the sea surface.

According to the seawater temperature equation (1), the seawater temperature equation (2) and the seawater temperature equation (3), it is known that the sea surface water temperature is closely related to heat fluxes and sea currents without the influence of the heat source term. In an open sea area or a semi-closed bay, the sea surface heat fluxes of two points C and D which are not far apart (generally within 20 kilometers) are basically the same. If the hydrological environments of the two points are basically the same (current distribution characteristics and the marine topography), the water temperature of points C and D will show a significant linear relationship without the influences of runoffs and other cold and heat sources.

Constructing the linear relationship model:

the water temperature value of the water temperature estimation station=A×a water temperature value of the water temperature reference station+B;

where A and B are linear regression coefficients.

A method for screening and eliminating the water temperature estimation stations includes the following steps:

based on the linear relationship model, eliminating the water temperature estimation stations with a correlation coefficient between the water temperature estimation station and the water temperature reference station below 0.85.

The background water temperature calculation module is connected with the temperature rise calculation module, and the working process of the background water temperature calculation module includes:

collecting the sea surface water temperature observation value after the operation of the water temperature reference station and the synchronized sea surface water temperature value after the operation of the satellite remote sensing, and correcting the sea surface water temperature value obtained by satellite remote sensing based on the sea surface water temperature observation value of the water temperature reference station to obtain the corrected parameters of the remote sensing water temperature of the water temperature reference station;

that is, a value of the background water temperature of the water temperature estimation station=A×the water temperature value of the water temperature reference station+B+the corrected parameter.

A working process of the temperature rise calculation module includes following steps:

According to the seawater temperature method mentioned above, a linear relationship will be broken when one of points C and D is affected by a heat source. Assuming that point C is affected by a heat source and point D is not affected by the heat source, when the temperature of point C is affected by an additional superimposed heat source, the water temperature of point C=the background water temperature of point C+temperature rise value or temperature drop value of point C; therefore, when the heat source affects point C and point D is not affected by the heat source, the temperature rise value or temperature drop value at point C cannot be directly distinguished by the on-site water temperature observation, but the environmental background water temperature at point C may be obtained through the water temperature at point D and the previous linear relationship between the water temperature at point C and the water temperature at point D, and the temperature rise value or temperature drop value at point C may be obtained through the on-site absolute water temperature observation (the environmental background water temperature+the temperature rise value or the temperature drop value) and the calculated environmental background water temperature at point C, thus obtaining the temperature rise value or the temperature drop value at point C influenced by the heat sources. Therefore, if the water temperature at points C and D is observed in advance before any point C or D is affected by the heat source, the linear relationship between the two is obtained, when one point of C or D is affected by a heat source or a cold source, the background water temperature of the affected point can be calculated through the linear relationship between the two, so as to obtain the water temperature rise value or water temperature drop value.

Embodiment 3

In this embodiment, the coastal bank of Ningde City in Fujian Province is taken as an example, a plurality of temporary water temperature observation stations are arranged and divided into three groups for testing the correlation of the water temperature linear relationship, which respectively represent open sea areas and a bay sea area. The distance between each group of stations is 10 kilometers-30 kilometers, as shown in Table 1. The water temperature observation time of each group is the same, and the water temperature observation adopts RBR XR-620 CTD. There are no less than 2 water temperature observation stations in each group. One station in each group is selected as the water temperature reference station, and the remaining stations are used as its water temperature estimation stations. The linear relationship between the water temperatures of the water temperature reference station and the water temperature estimation station is fitted, and the mean square deviation of the fitted water temperature is calculated, to prove the linear correlation between each group of stations, and to test the accuracy of the fitted water temperature at the same time.

TABLE 1

Water temperature observation position and observation time information

| Groups | Station numbers | Locations Longitude | Latitude | Observation duration in summer |
|---|---|---|---|---|
| Group 1 (open sea area) | w134 | 119.794261 | 26.501725 | 6 Jun.-3 Jul. 2021 |
| | w135 | 119.810886 | 26.462253 | |
| Group 2 (bay sea area) | w123 | 120.011108 | 26.771256 | 11 Jun.-4 Jul. 2021 |
| | w126 | 119.901431 | 26.690111 | |
| | w131 | 119.693817 | 26.673664 | |
| Group 3 (open sea area) | w121 | 120.314617 | 26.949786 | 6 Jun.-3 Jul. 2021 |
| | w122 | 120.243806 | 26.930319 | |

Figure 3:
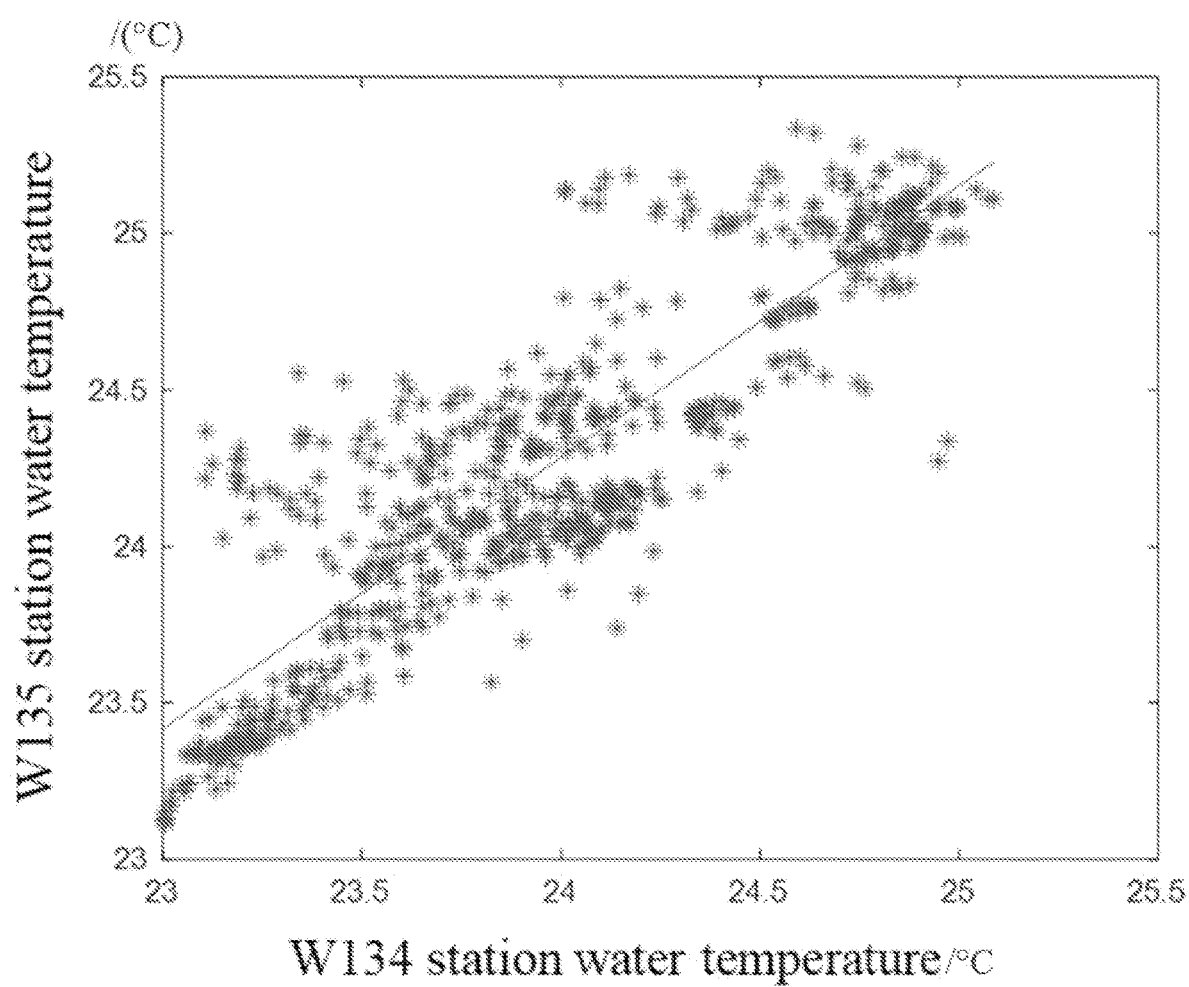
FIG. 3 is a linear fitting diagram of hourly water temperatures of w134 station and w135 station in Embodiment 3 according to the application.

(1) In the first group of water temperature linear fitting, w134 station is taken as the water temperature reference station (with an average water temperature of 23.978° C.), and w135 station is taken as its water temperature estimation station (with an average water temperature of 24.264° C.), and the daily average water temperature correlation coefficient of the two stations is 0.924, with a reliability exceeding 99%. There is a following linear relationship in calculating the water temperatures of the two stations: $T_{w135}=0.867\times T_{w134}+3.467$, and the mean square deviation is 0.069, indicating that there is a significant linear relationship between the two stations. The water temperature of w135 station calculated by taking w134 station as the water temperature reference station is more accurate. Therefore, the formula $T_{w135}=0.867\times T_{w134}+3.467$ and the hourly water temperature measured at w134 station may be used to calculate the hourly water temperature at w135 station in summer. As shown in FIG. 3, a linear fitting diagram of hourly water temperatures of w134 station and w135 station is shown.

Figure 4:
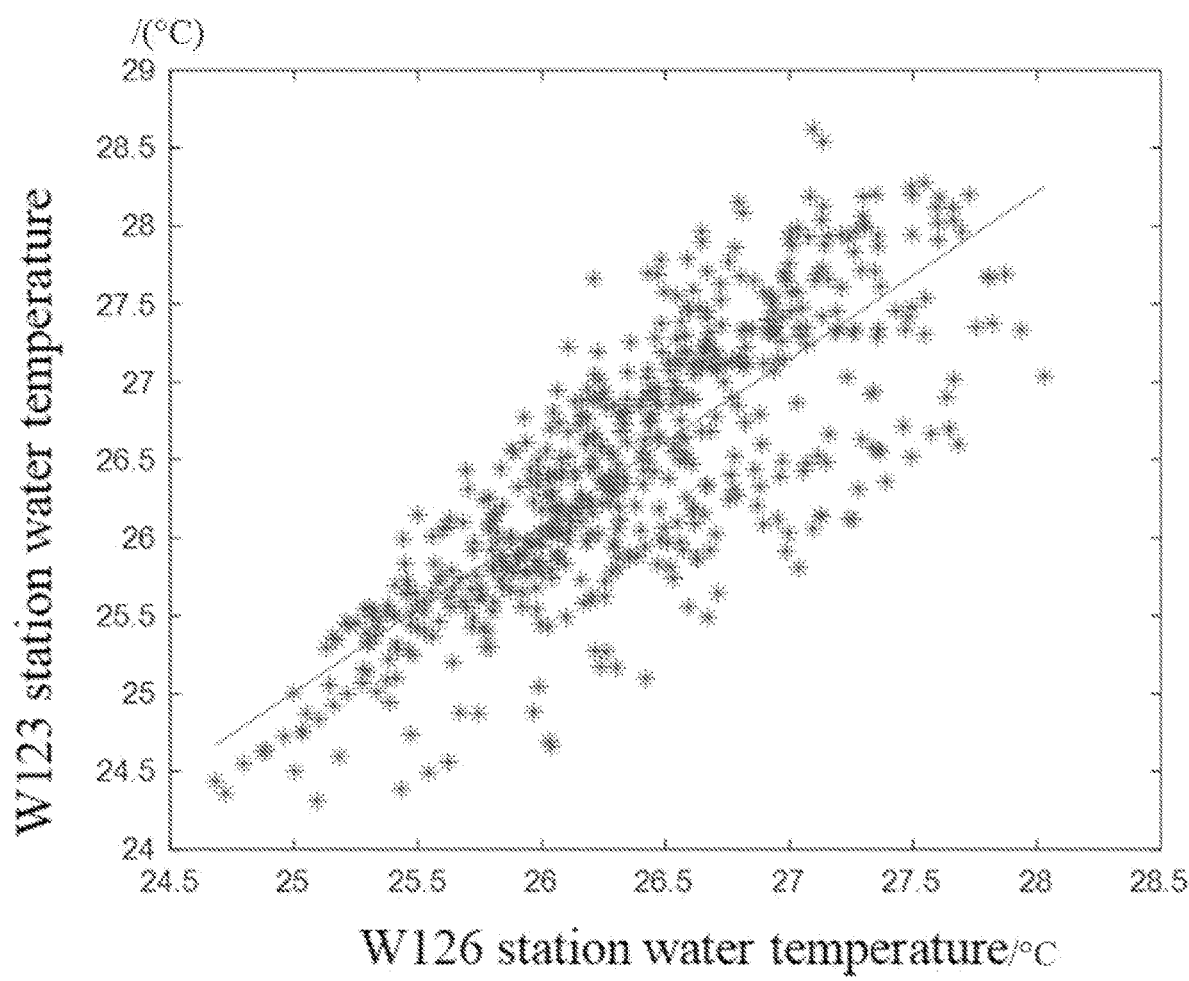
FIG. 4 is a linear fitting diagram of hourly water temperatures of w126 station and w131 station in Embodiment 3 according to the application.
Figure 5:
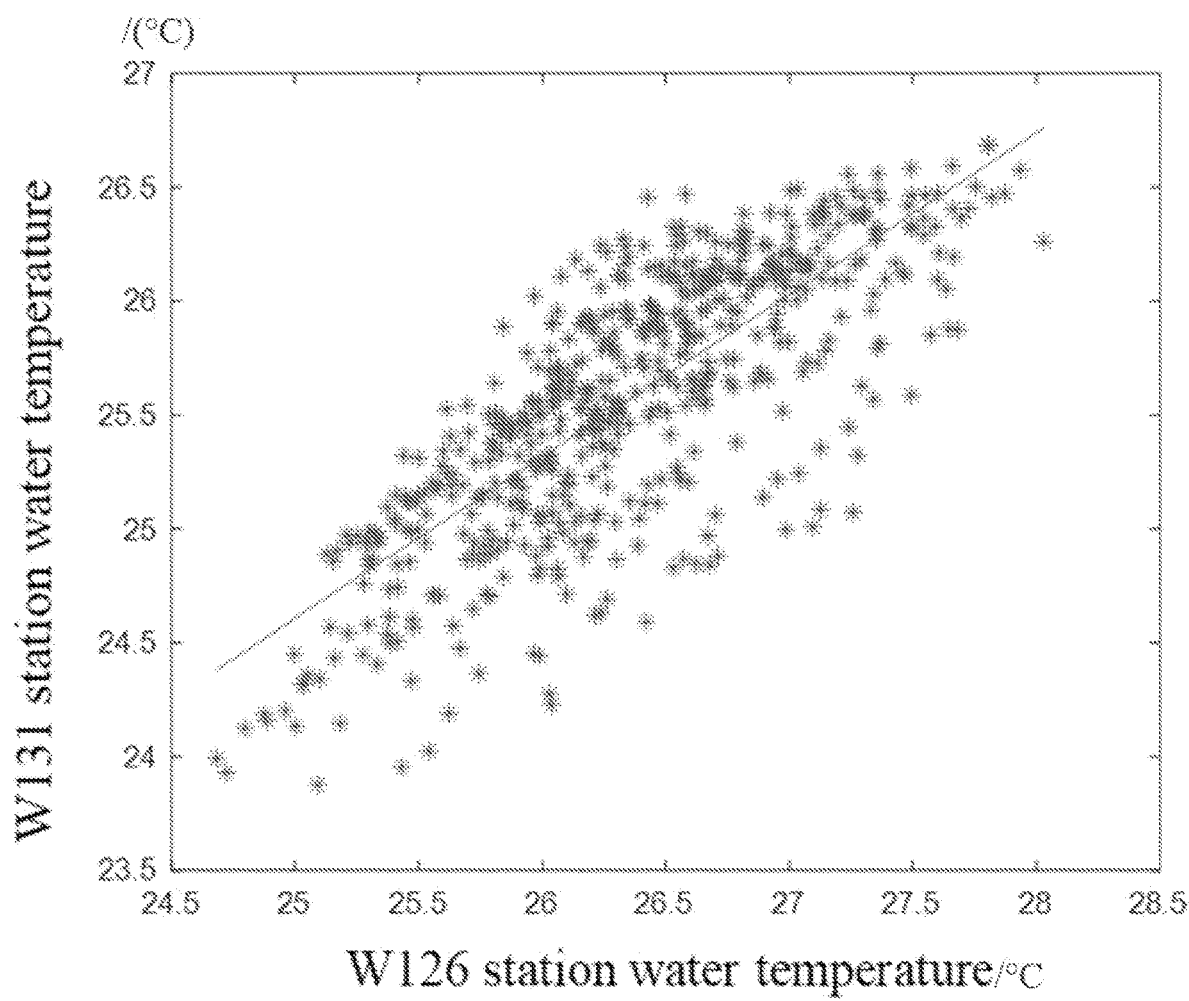
FIG. 5 is a linear fitting diagram of hourly water temperatures of w126 station and w123 station in Embodiment 3 according to the application.

(2) In the second group of water temperature linear fitting, w126 station is taken as the water temperature reference station (with an average water temperature of 26.354° C.), and w123 station and w131 station are taken as its water temperature estimation stations (with average water temperatures of 26.461° C. and 25.571° C.). Through correlation analysis, the daily average water temperature correlation coefficient of w123 station and w126 station is 0.937, and the daily average water temperature correlation coefficient of w126 station and w131 station is 0.879, with reliabilities exceeding 99%. It is obtained that the hourly water temperatures of station w126 and station w123 and the hourly water temperatures of station w126 and station w131 have the following linear relationships: $T_{w123}=1.069\times T_{w126}-1.725$, $T_{w131}=0.710\times T_{w126}+6.834$, and the mean square deviation are 0.274 and 0.133, respectively. Therefore, it may be seen that there are significant linear relationships among the three stations. Therefore, the formula $T_{w123}=1.069\times T_{w126}-1.725$, the formula $T_{w131}=0.710\times T_{w126}+6.834$, and the hourly water temperature measured at w126 station may be used to calculate the hourly water temperature at w123 station and w131 station in summer. As shown in FIG. 4 and FIG. 5, a linear fitting diagram of hourly water temperatures of w126 station and w131 station, and a linear fitting diagram of hourly water temperatures of w126 station and w123 station are respectively shown.

Figure 6:
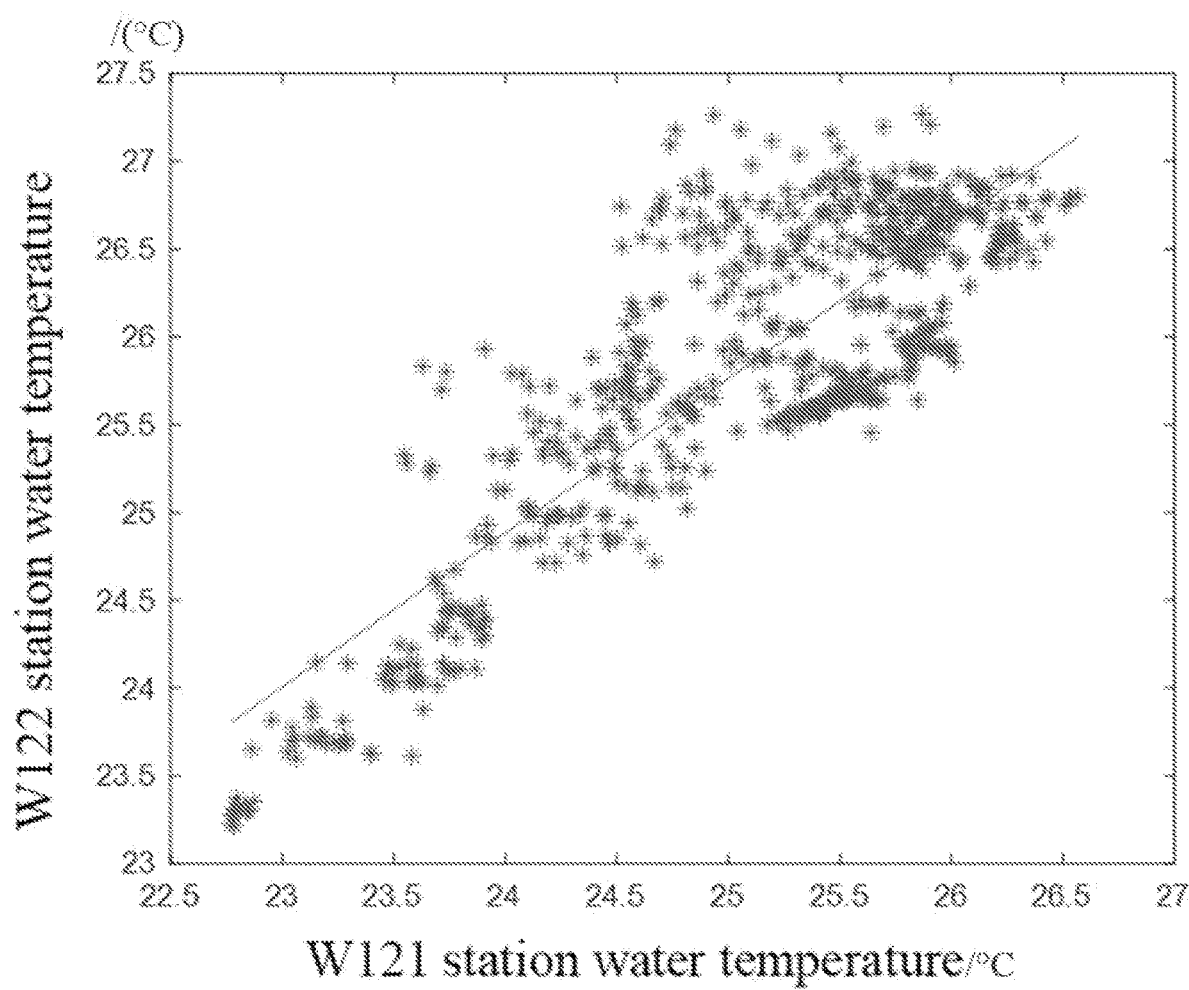
FIG. 6 is a linear fitting diagram of hourly water temperatures of w121 station and w122 station in Embodiment 3 according to the application.

(3) In the third group of water temperature linear fitting, w121 station is taken as the water temperature reference station (with an average water temperature of 25.075° C.), and w122 station is taken as its water temperature estimation station (with an average water temperature of 25.832° C.). Through correlation analysis, the daily average water temperature correlation coefficient of w121 station and w122 station is 0.875, with a reliability exceeding 99%. It is obtained that the hourly water temperatures of the two stations has the following linear relationships: $T_{w122}=0.878\times T_{w121}+3.802$, and the mean square error is 0.246, indicating that there is a significant linear relationship between the two stations. Therefore, the formula $T_{w122}=0.878\times T_{w121}+3.802$ and the hourly water temperature measured at w121 station may be used to calculate the hourly water temperature at w122 station in summer. As shown in FIG. 6, a linear fitting diagram of hourly water temperatures of w121 station and w122 station is shown.

From the above experimental results of linear fitting of water temperature, it may be seen that, whether in the bay or in the open sea area, when the current distribution characteristics, water depth topography characteristics and meteorological conditions of each group of stations are similar, and the distance between each group of stations is less than 30 kilometers, there is a significant linear relationship between the water temperatures of each group of stations, and the mean square deviation is very small. Therefore, when the water temperature of one water temperature station in the group is affected by the heat source, the environmental background water temperature of the affected water temperature station is calculated by the other water temperature station.

Embodiment 4

In this embodiment, the measured sea surface water temperature of the dock of the National Deep-Sea Base Management Center is taken as an example to verify the accuracy of the nearshore sea surface water temperature obtained by the Himawari satellite.

Figure 7:
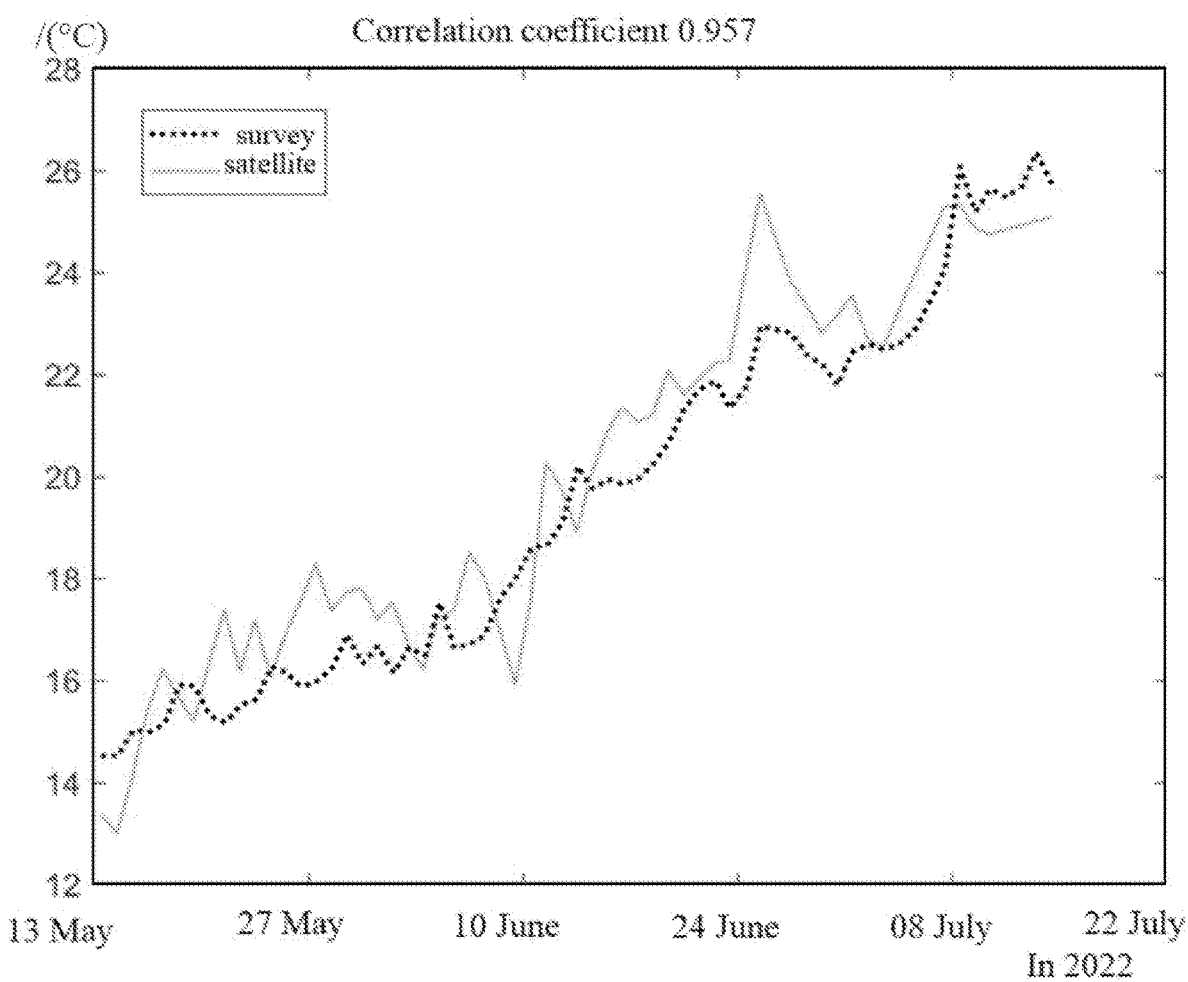
FIG. 7 is a schematic diagram of correlation analysis between measured sea surface water temperature data and synchronous remote sensing sea surface water temperature in Embodiment 4 according to the application.

In order to verify the accuracy of the nearshore surface water temperature remote sensing data obtained by the Himawari satellite in the coastal waters, the surface water temperature is observed at the dock of the National Deep-Sea Base Management Center from May 13 to Jul. 12, 2022. The float-up method is used to observe the sea surface water temperature, and the water temperature observation equipment is placed under the floating ball to ensure the accuracy and reliability of the acquired sea surface water temperature data, meanwhile, the synchronized hourly remote sensing data of surface water temperature obtained by the Himawari satellite at the dock location during the observation period are collected. The correlation between the measured sea surface water temperature data and the synchronized remote sensing sea surface water temperature is analyzed. The linear analysis result is shown in FIG. 7, and the correlation coefficient between them is 0.957, which shows that the hourly sea surface water temperature remote sensing data obtained by the Himawari satellite is accurate, and may be used to obtain the water temperature data before the operation of nuclear power plants. Through the sea surface water temperature remote sensing data obtained by the Himawari satellite, the selection and correlation analysis of the water temperature reference station and water temperature estimation station may be carried out.

Embodiment 5

This embodiment takes the Haiyang nuclear power plant Phase I project in Yantai City, Shandong Province as an example, and introduces in detail the method for determining a background water temperature of thermal discharge from operating nuclear power plants of this application.

Figure 8:
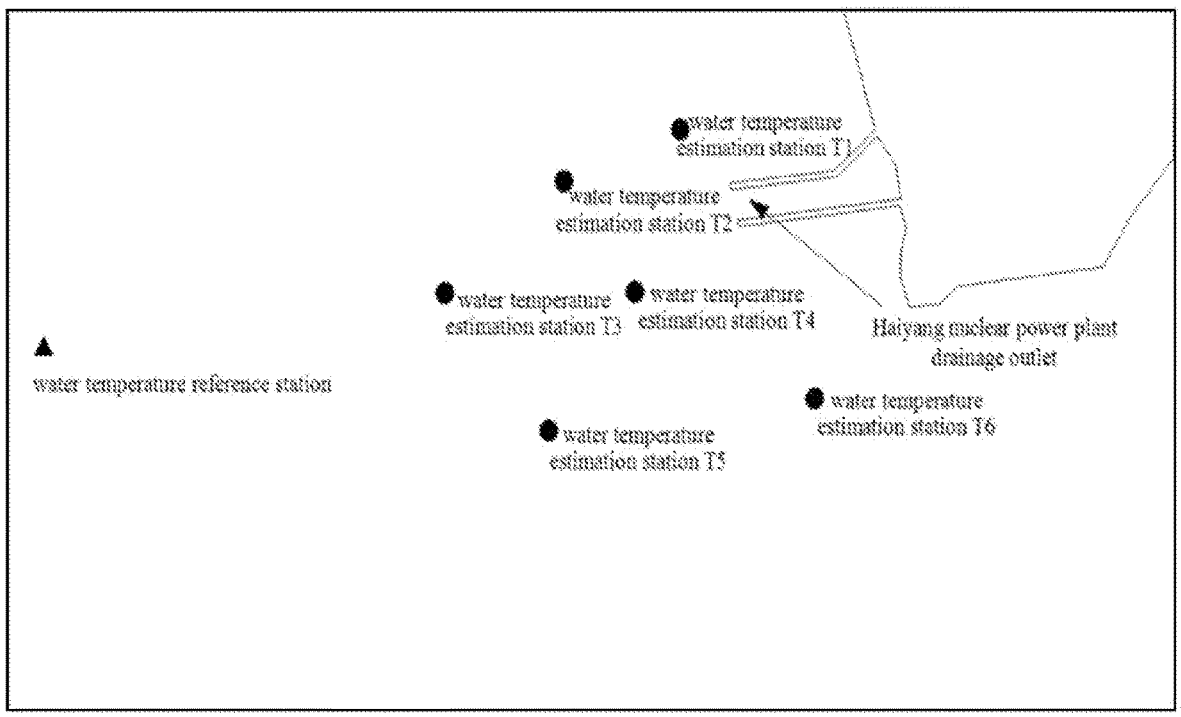
FIG. 8 is a schematic diagram showing positions of a water temperature reference station and each water temperature estimation station in Embodiment 5 according to the application.
Figure 9:
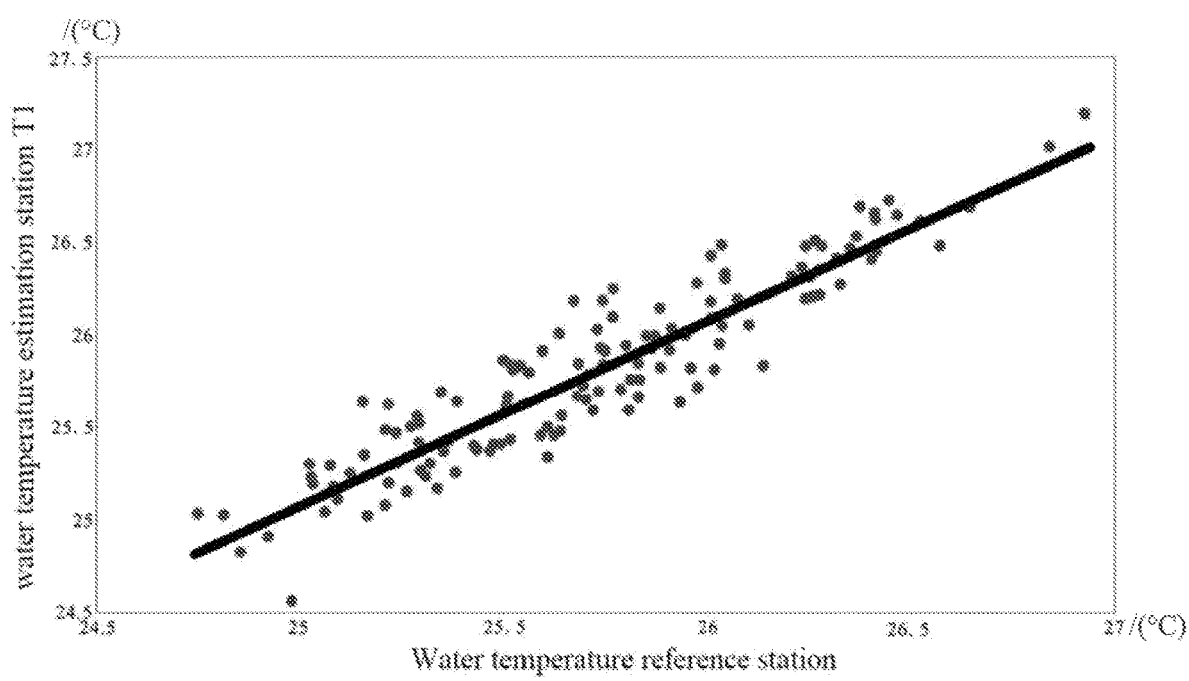
FIG. 9 is a linear fitting diagram of water temperatures between the water temperature reference station and the water temperature estimation station T1 in Embodiment 5 according to the application.
Figure 10:
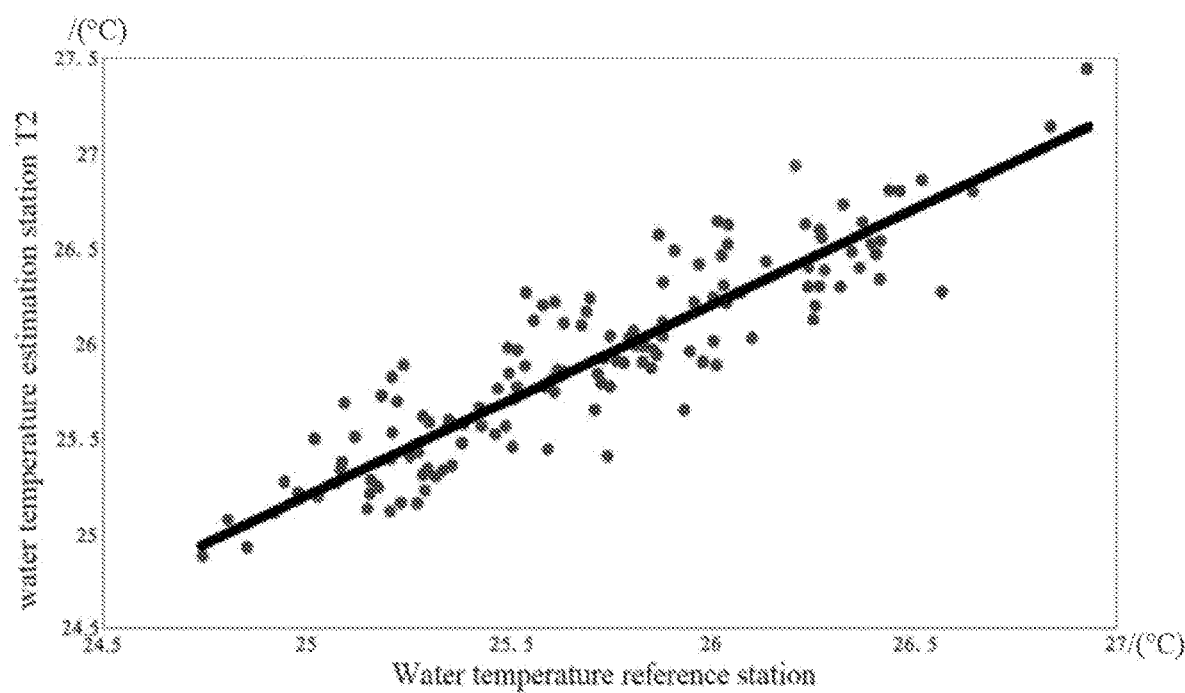
FIG. 10 is a linear fitting diagram of water temperatures between the water temperature reference station and the water temperature estimation station T2 in Embodiment 5 according to the application.
Figure 11:
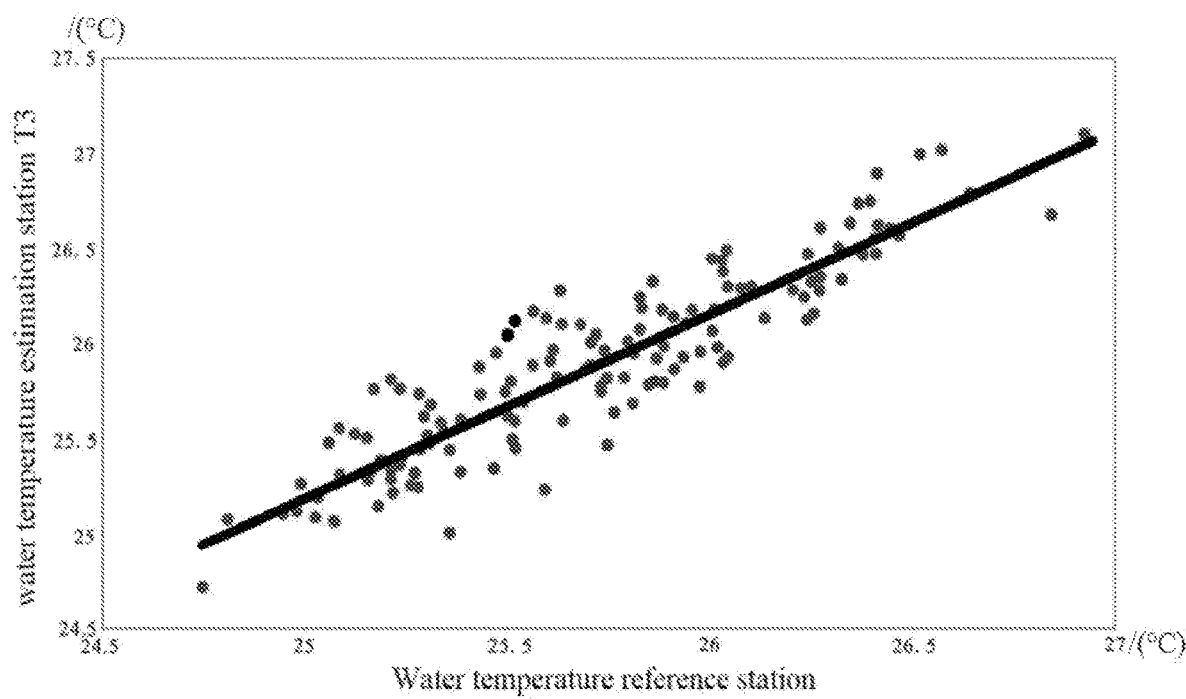
FIG. 11 is a linear fitting diagram of water temperatures between the water temperature reference station and the water temperature estimation station T3 in Embodiment 5 according to the application.
Figure 12:
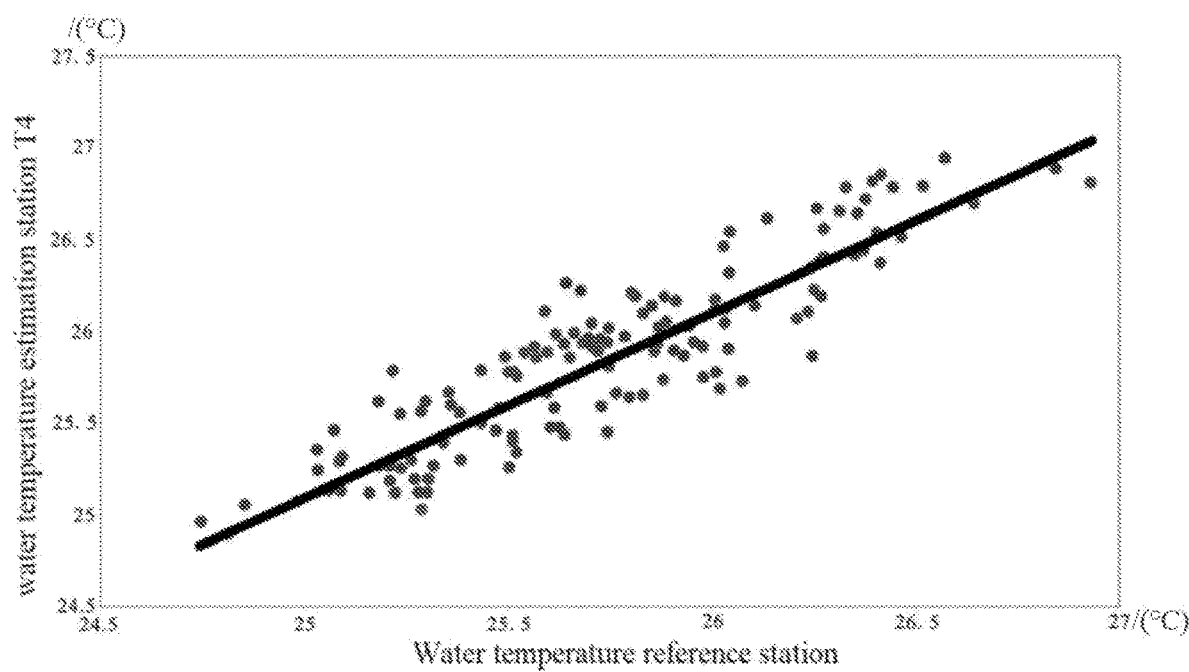
FIG. 12 is a linear fitting diagram of water temperatures between the water temperature reference station and the water temperature estimation station T4 in Embodiment 5 according to the application.
Figure 13:
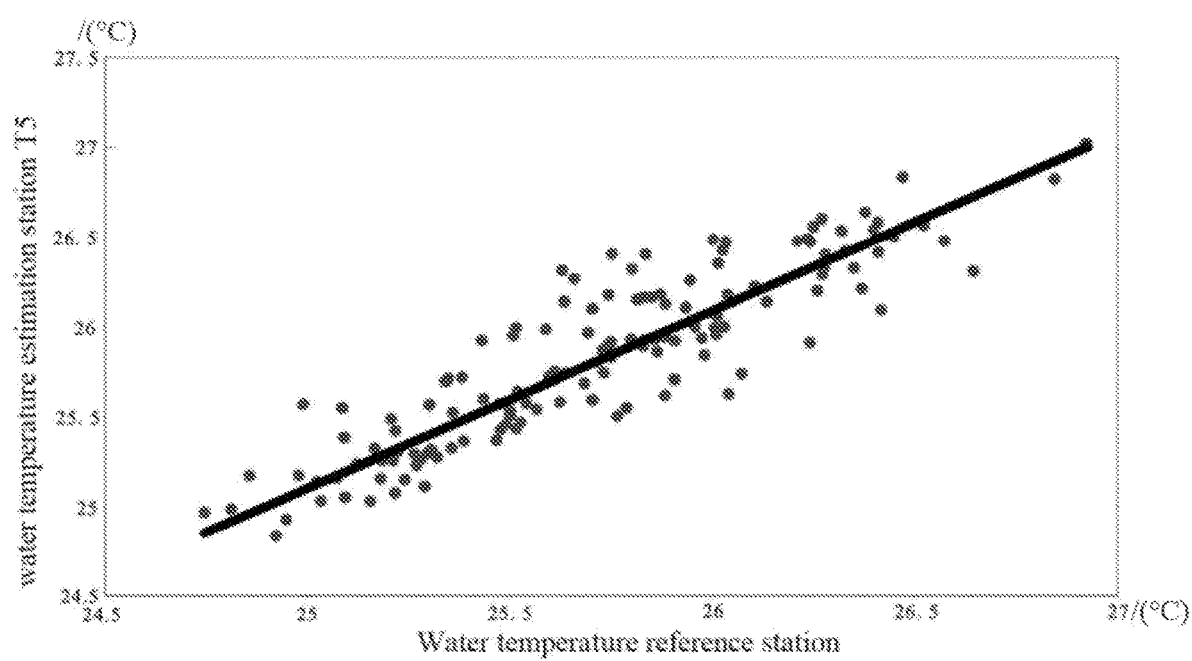
FIG. 13 is a linear fitting diagram of water temperatures between the water temperature reference station and the water temperature estimation station T5 in Embodiment 5 according to the application.
Figure 14:
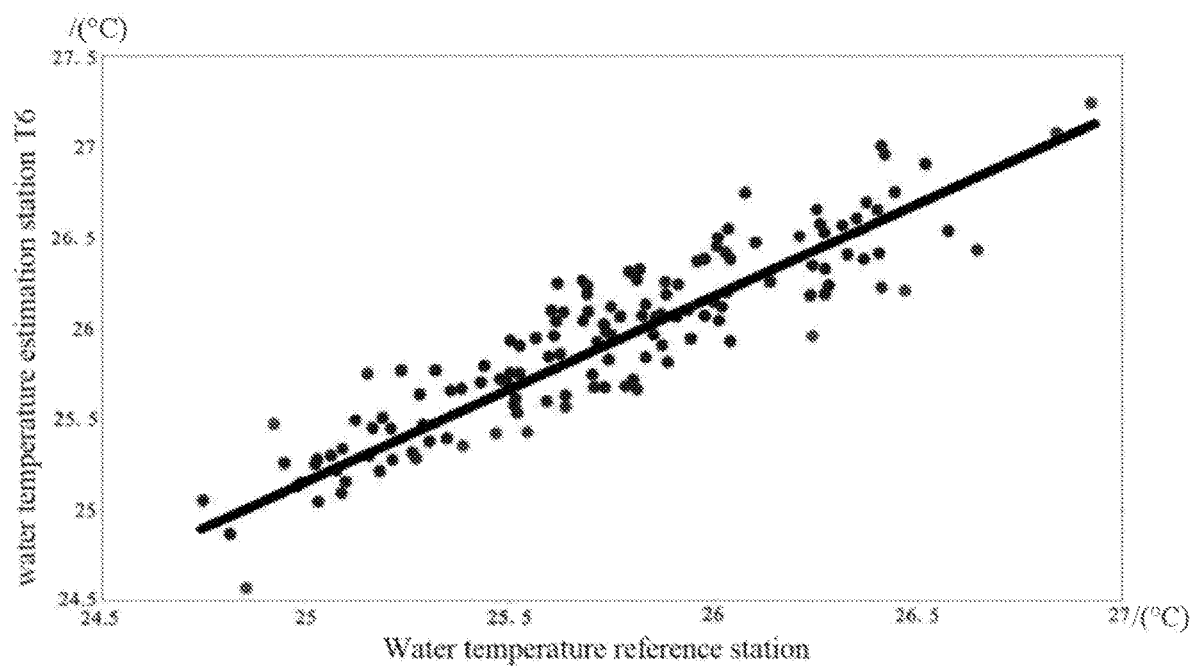
FIG. 14 is a linear fitting diagram of water temperatures between the water temperature reference station and the water temperature estimation station T6 in Embodiment 5 according to the application.

Firstly, the surface water temperatures obtained by the Himawari satellite remote sensing in typical seasons before and after the nuclear power plant operation is selected, that is, the surface water temperature remote sensing data in July 2017 and July 2022. At the same time, combined with the prediction results of thermal discharge in the sea area utilization demonstration report of this project, within 20 kilometers of the sea area around the drainage outlet, the area where the water temperature basically does not change before and after the nuclear power plant operation is selected as the water temperature reference station. Through comparative analysis, it may be known that the water temperature at Haiyangxingang, which is about 8.2 kilometers away from the drainage outlet, is not affected by thermal discharge. At the same time, according to the numerical calculation results of the temperature rise influence of thermal discharge in the sea area utilization demonstration report of Haiyang Nuclear Power Plant Phase I project, the location of Haiyangxingang is outside the temperature rise range of 0.1° C., so it is selected as the water temperature reference station, and six stations within 4 kilometers of the drainage outlet of the nuclear power plant are selected as the water temperature estimation stations, i.e. T1, T2, T3, T4, T5 and T6, the distance between adjacent water temperature estimation stations is about 700 meters-1.1 kilometers, which is basically within the influence range of 1° C.-4° C. in the temperature rise zone of thermal discharge. The position schematic of water temperature reference station and water temperature estimation stations is shown in FIG. 8.

According to the sea surface temperature distribution obtained by the Himawari satellite remote sensing from 1:00 on Jul. 3, 2017 to 0:00 on Jul. 29, 2017, the time series distribution of sea surface temperature of the water temperature reference station and the water temperature estimation station is extracted, and the linear correlation analysis of water temperature reference station and water temperature estimation station is carried out to obtain the linear relationship between the water temperature reference station and each water temperature estimation station, where $T_c$ represents the water temperature of the water temperature reference station, and T1, T2, T3, T4, T5 and T6 represent the water temperature of each water temperature estimation station, as shown in Table 2. The linear fitting diagrams of water temperature between the water temperature reference station and each water temperature estimation station are shown in FIG. 9, FIG. 10, FIG. 11, FIG. 12, FIG. 13 and FIG. 14. Table 2 is a summary of the linear relationship between the water temperature reference station and each water temperature estimation station. It may be seen from Table 2 that there is a very good linear relationship between the water temperature reference station and each water temperature estimation station, and the mean square deviations are very small, which shows that the environmental background water temperature of each water temperature estimation station may be calculated through the water temperature reference stations and the linear regression coefficients, that is $T_i = A_i \times T_c + B_i$, where $A_i$ and $B_i$ represent the linear regression coefficients corresponding to the i-th water temperature estimation station, and $T_i$ represents the environmental background water temperature of the i-th water temperature estimation station.

TABLE 2

Summary of the linear relationship between the water temperature reference station and each water temperature estimation station

| Serial number | Linear relationship | Mean square deviation |
|---|---|---|
| 1 | T1 = 0.9944 × $T_c$ + 0.2142 | 0.0407 |
| 2 | T2 = 0.9880 × $T_c$ + 0.6042 | 0.2142 |
| 3 | T3 = 0.9998 × $T_c$ + 0.0861 | 0.0440 |
| 4 | T4 = 0.9882 × $T_c$ + 0.5424 | 0.0501 |
| 5 | T5 = 0.9883 × $T_c$ + 0.5893 | 0.0851 |
| 6 | T6 = 0.9752 × $T_c$ + 0.3174 | 0.0369 |

From Jun. 11, 2022 to Jun. 23, 2022, the surface water temperature observation of seawater is carried out at the water temperature reference station in Haiyangxingang for about 13 days, which is used to correct the water temperature observation value of the water temperature reference station and the water temperature of the water temperature reference station obtained by the Himawari satellite remote sensing so as to improve the accuracy of calculation; after correction, the average difference between the surface water temperature measured by the water temperature reference station and the surface water temperature interpreted by satellite remote sensing is 0.074° C., that is, the corrected parameter=0.074. Therefore, the calculation formula of environmental background water temperature of six water temperature estimation stations is: $T_i = A_i \times T_c + B_i + 0.074$, where $T_c$ represents the water temperature of the water temperature reference station, $A_i$ and $B_i$ represent the linear regression coefficients corresponding to the i-th water temperature estimation station, and $T_i$ represents the environmental background water temperature of the i-th water temperature estimation station.

According to the above formula, the environmental background water temperature of each water temperature estimation station may be calculated by using the hourly seawater surface water temperature observation value of the water temperature reference station on Jun. 12, 2022, and the estimated environmental background water temperature of each water temperature estimation station is shown in Table 3.

TABLE 3

Summary of environmental background water temperature calculation values of each water temperature calculation station

| Time | Station number | | | | | |
|------|--------|--------|--------|--------|--------|--------|
|      | T1     | T2     | T3     | T4     | T5     | T6     |
| 1:00  | 21.148 | 21.416 | 21.122 | 21.358 | 21.407 | 20.887 |
| 2:00  | 21.175 | 21.444 | 21.150 | 21.385 | 21.434 | 20.914 |
| 3:00  | 21.209 | 21.477 | 21.183 | 21.419 | 21.468 | 20.947 |
| 4:00  | 21.172 | 21.441 | 21.147 | 21.383 | 21.431 | 20.911 |
| 5:00  | 21.356 | 21.623 | 21.331 | 21.565 | 21.614 | 21.091 |
| 6:00  | 21.305 | 21.573 | 21.281 | 21.515 | 21.564 | 21.041 |
| 7:00  | 21.296 | 21.564 | 21.272 | 21.506 | 21.555 | 21.033 |
| 8:00  | 21.322 | 21.590 | 21.297 | 21.532 | 21.580 | 21.047 |
| 9:00  | 21.327 | 21.594 | 21.302 | 21.536 | 21.585 | 21.063 |
| 10:00 | 21.578 | 21.844 | 21.554 | 21.786 | 21.835 | 21.309 |
| 11:00 | 21.441 | 21.707 | 21.417 | 21.649 | 21.698 | 21.174 |
| 12:00 | 21.289 | 21.557 | 21.264 | 21.499 | 21.547 | 21.025 |
| 13:00 | 21.220 | 21.488 | 21.195 | 21.430 | 21.479 | 20.958 |
| 14:00 | 21.407 | 21.674 | 21.383 | 21.616 | 21.665 | 21.141 |
| 15:00 | 21.453 | 21.720 | 21.429 | 21.662 | 21.711 | 21.186 |
| 16:00 | 21.542 | 21.808 | 21.518 | 21.750 | 21.799 | 21.273 |
| 17:00 | 21.689 | 21.954 | 21.666 | 21.896 | 21.945 | 21.417 |
| 18:00 | 21.687 | 21.952 | 21.664 | 21.894 | 21.943 | 21.416 |
| 19:00 | 21.825 | 22.089 | 21.803 | 22.032 | 22.080 | 21.551 |
| 20:00 | 21.919 | 22.183 | 21.898 | 22.125 | 22.174 | 21.644 |
| 21:00 | 21.924 | 22.188 | 21.903 | 22.130 | 22.179 | 21.648 |
| 22:00 | 21.986 | 22.249 | 21.965 | 22.191 | 22.240 | 21.709 |
| 23:00 | 22.545 | 22.805 | 22.527 | 22.747 | 22.796 | 22.257 |
| 0:00  | 22.145 | 22.407 | 22.125 | 22.350 | 22.399 | 21.865 |

After the environmental background water temperature of each water temperature estimation station is calculated, the actual temperature rise value may be obtained by subtracting the actual water temperature observation value of each water temperature estimation station at the site after the operation of the nuclear power plant from the synchronized environmental background water temperature calculation value.

The above-mentioned embodiment is only a description of the preferred mode of the application, and does not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. A method for determining a background water temperature of thermal discharge from operating nuclear power plants based on remote sensing, comprising following steps:
    S1, collecting distributions of satellite remote sensing sea surface water temperatures with a high spatiotemporal resolution before and after nuclear power plant operations and background information of nuclear power plants, based on the distributions of the satellite remote sensing sea surface water temperatures before and after the nuclear power plant operations and the background information, selecting a water temperature reference station and water temperature estimation stations;
    S2, collecting hourly satellite remote sensing sea surface water temperatures of the water temperature reference station and the water temperature estimation stations in typical seasons before the nuclear power plant operation, based on the satellite remote sensing sea surface water temperatures with the high spatiotemporal resolution, constructing a linear relationship model of water temperatures between the water temperature reference station and the water temperature estimation stations; and based on the linear relationship model, screening and eliminating the water temperature estimation stations not in line with predetermined conditions;
    S3, collecting a sea surface water temperature observation value of the water temperature reference station after the nuclear power plant operation and a satellite remote sensing synchronous sea surface water temperature value after the nuclear power plant operation, correcting a value of the satellite remote sensing sea surface water temperature to obtain a corrected parameter of the linear relationship model between the water temperature reference station and the water temperature estimation stations; and based on the corrected parameter, obtaining background water temperatures of the water temperature estimation stations after the nuclear power plant operation; and
    S4, based on a water temperature of the water temperature reference station, calculating a difference value between the background water temperatures of the water temperature estimation stations and synchronous water temperatures of the water temperature estimation stations, and obtaining a temperature rise water temperature value.

2. The method for determining a background water temperature of thermal discharge from operating nuclear power plants based on remote sensing according to claim 1, wherein the background information in the S1 comprises a hydrological environment, a marine topography and meteorological information.

3. The method for determining a background water temperature of thermal discharge from operating nuclear power plants based on remote sensing according to claim 1, wherein a method for selecting the water temperature reference station in the S1 comprises:
    collecting the distributions of the satellite remote sensing sea surface water temperatures before and after the nuclear power plant operations, and selecting a station not affected by the thermal discharge as the water temperature reference station.

4. The method for determining a background water temperature of thermal discharge from operating nuclear power plants based on remote sensing according to claim 1, wherein a method for selecting the water temperature estimation stations in the S1 comprises:
    based on the distributions of the satellite remote sensing sea surface water temperatures before and after the nuclear power plant operations, selecting water temperature stations in a temperature-rising area of drainage outlets of the nuclear power plants; and
    carrying out an encryption interpolation on a distribution of the water temperature stations to obtain a plurality of the water temperature estimation stations.

5. The method for determining a background water temperature of thermal discharge from operating nuclear power plants based on the remote sensing according to claim 1, wherein the linear relationship model comprises:
    a water temperature value of the water temperature estimation station=A×a water temperature value of the water temperature reference station+B;
    wherein A and B are linear regression coefficients.

6. The method for determining a background water temperature of thermal discharge from operating nuclear power plants based on remote sensing according to claim 4, wherein a method for screening and eliminating the water temperature estimation stations not in line with the predetermined conditions in the S2 comprises:
    based on the linear relationship model, eliminating the water temperature estimation stations with a correlation below 0.85.

7. The method for determining a background water temperature of thermal discharge from operating nuclear power plants based on remote sensing according to claim 1, wherein a method for obtaining the background water temperatures of the water temperature estimation stations in the S3 comprises:
    collecting the sea surface water temperature observation value of the water temperature reference station and the satellite remote sensing synchronous sea surface water temperature value, and based on the sea surface water temperature observation value, correcting the value of the satellite remote sensing sea surface water temperature to obtain the corrected parameter; and
    based on the corrected parameter and the linear relationship model, obtaining the background water temperatures of the water temperature estimation stations, and a value of the background water temperature of the water temperature estimation station=A×the water temperature value of the water temperature reference station+B+the corrected parameter.

8. A system for determining a background water temperature of thermal discharge from operating nuclear power plants based on remote sensing, comprising a station selection module, a model construction module, a background water temperature calculation module and a temperature rise calculation module;
    the station selection module is connected with the model construction module, and the station selection module is used for selecting the water temperature reference station and the water temperature estimation stations;
    the model construction module is connected with the background water temperature calculation module, and the model construction module is used for constructing a linear relationship model between the water temperature values of the water temperature reference station and the water temperature estimation stations;
    the background water temperature calculation module is connected with the temperature rise calculation module, and the background water temperature calculation module is used for calculating the background water temperatures of the water temperature estimation stations based on the linear relationship model; and
    the temperature rise calculation module is used for calculating the temperature rise water temperature values of the water temperature estimation stations.

9. The system for determining a background water temperature of thermal discharge from operating nuclear power plants based on remote sensing according to claim 8, wherein the station selection module comprises an acquisition unit and a station selection unit;
    the acquisition unit is connected with the station selection unit, and the acquisition unit is used for acquiring the distributions of the satellite remote sensing sea surface water temperatures and the background information of the nuclear power plants; and
    the station selection unit is used for selecting the water temperature reference station and the water temperature estimation stations based on the distributions of the satellite remote sensing sea surface water temperatures before and after the nuclear power plant operations and the background information.

\* \* \* \* \*